United States Patent
Ha et al.

(10) Patent No.: US 6,278,405 B1
(45) Date of Patent: Aug. 21, 2001

(54) AI ANTENNA DRIVING DEVICE AND METHOD FOR CONTROLLING THE SAME

(75) Inventors: Dong-In Ha, Seoul; Seong-Joong Kim, Kyonggi-do; Dong-Hwan Kim, Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/447,918

(22) Filed: Nov. 23, 1999

(30) Foreign Application Priority Data

Nov. 23, 1998 (KR) .................................................. 98-50274

(51) Int. Cl.⁷ ....................................................... H01Q 3/00
(52) U.S. Cl. ............................. 342/359; 342/74; 343/766
(58) Field of Search ................................ 342/74, 75, 359; 343/766, 757

(56) References Cited

U.S. PATENT DOCUMENTS

| | | | |
|---|---|---|---|
| 4,725,843 | * | 2/1988 | Suzuki et al. ........................ 342/359 |
| 5,347,286 | * | 9/1994 | Babitch ................................ 342/359 |
| 5,376,941 | * | 12/1994 | Fukazawa et al. .................... 342/359 |
| 5,583,514 | * | 12/1996 | Fulop .................................... 342/359 |
| 5,594,460 | * | 1/1997 | Eguchi ................................ 343/765 |
| 5,983,071 | * | 11/1999 | Gagnon et al. ........................ 455/3.2 |

* cited by examiner

Primary Examiner—Dao Phan
(74) Attorney, Agent, or Firm—Dilworth & Barrese, LLP

(57) ABSTRACT

An antenna driving device for a mobile communication terminal including a flat antenna and a receiver for receiving a radio signal through the flat antenna. The device has a flat antenna driver for shifting the direction of the flat antenna by predetermined steps; an RSSI detector for detecting the RSSI value of the received radio signal for each shifting step of the flat antenna; a position detector for detecting a position of the flat antenna through the flat antenna driver; a memory for storing the RSSI value detected for each step and the associated flat antenna positional information; and a controller for controlling the flat antenna driver and the RSSI detector, and for shifting the direction of the flat antenna to a position having the highest RSSI value by controlling the flat antenna driver. The flat antenna driver comprises a motor for shifting the direction of the flat antenna; and a driver for driving the motor under the control of the controller to shift the direction of the flat antenna.

11 Claims, 4 Drawing Sheets

AI ANTENNA DRIVING DEVICE AND METHOD FOR CONTROLLING THE SAME

PRIORITY

This application claims priority to an application entitled "AI Antenna Driving Device and Method For Controlling the Same" filed in the Korean Industrial Property Office on Nov. 23, 1998 and assigned Ser. No. 98-50274, the contents of which are hereby incorporated by reference.

BACKGROUND OF THE INVENTION

1. Field of the Invention

The present invention relates generally to an antenna driving device for a mobile communication terminal, and in particular, to an AI (Artificial Intelligence) antenna driving device for automatically shifting the position (or direction) of an antenna to a position having a higher RSSI (Received Signal Strength Indicator) value, and a method for controlling the same.

2. Description of the Related Art

In general, a mobile communication terminal uses a flat antenna, such as a patch antenna, in order to increase portability of the terminal and to facilitate installation of the antenna. However, since flat antennas have a directional radiation property, their properties depend on the state of installation as well as working environment of the antenna. That is, the flat antenna points in a different direction according to whether the user carries the mobile communication terminal at the side or in a pocket, or puts the mobile communication terminal on a desk. Therefore, the flat antenna has a directivity property which depends on the circumstances of the position of the mobile communication terminal.

FIG. 1 shows the directivity property of a flat antenna, which depends on the direction of the antenna. In FIG. 1, reference numeral 10 denotes a satellite mounted with a relay, and reference numeral 110 denotes a flat antenna. When located at a position C, the flat antenna 110 has a directivity C'. At this point, since the directivity of the flat antenna 110 is best matched to the directivity of the satellite 10, a signal received through the flat antenna 110 has a higher RSSI. However, when located at position A, the flat antenna 110 has a directivity A'. At this point, the directivity of the flat antenna 110, facing the ground, is not well matched to the directivity of the satellite 10, so that the received signal of the flat antenna 110 has a lower RSSI. Further, when located at position B, the flat antenna 110 has a directivity B'. Even in this case, the directivity of the flat antenna 110 is not well matched to the directivity of the satellite 10, thus causing a decrease in the RSSI of the flat antenna 110.

As described above, the flat antenna has a directivity which depends on the state of installation and the working environment. The lack of proper directivity causes deterioration of the quality of communication.

SUMMARY OF THE INVENTION

It is, therefore, an object of the present invention to provide an AI antenna driving device for automatically shifting the direction of a flat antenna to a position having a higher RSSI value according to the state of installation and the working environment of the flat antenna in a mobile communication terminal, and a method for controlling the same.

In accordance with one aspect of the present invention, there is provided an antenna driving device for a mobile communication terminal including a flat antenna and a receiver for receiving a radio signal through the flat antenna. The device comprises a flat antenna driver for shifting the direction of the flat antenna by predetermined steps; an RSSI detector for detecting an RSSI value of the received radio signal for each shifting step of the flat antenna; a position detector for detecting the position of the flat antenna through the flat antenna driver, a memory for storing the RSSI value detected for each step and the associated positional information of the flat antenna; and a controller for controlling the flat antenna driver and the RSSI detector, and for shifting the direction of the flat antenna to a position having the highest RSSI value by controlling the flat antenna driver. The flat antenna driver comprises a motor for shifting the direction of the flat antenna; and a driver for driving the motor under the control of the controller to shift the direction of the flat antenna.

In accordance with another aspect of the present invention, there is provided a method for controlling an antenna driving device including a memory for storing a plurality of detected RSSI values, the flat antenna positional information associated with the detected RSSI values, and a reference RSSI value. The method comprises the steps of: upon power-on, shifting the direction of the flat antenna by predetermined steps; detecting RSSI values while the direction of the flat antenna is shifted by predetermined steps; storing the detected RSSI values and the flat antenna positional information associated with the detected RSSI values in the memory; shifting the direction of the flat antenna to the position having the highest one of the detected RSSI values; detecting an RSSI value at the shifted position and comparing the detected RSSI value with the reference RSSI value; and repeating the above procedure, if the detected RSSI value is lower than or equal to the reference RSSI value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
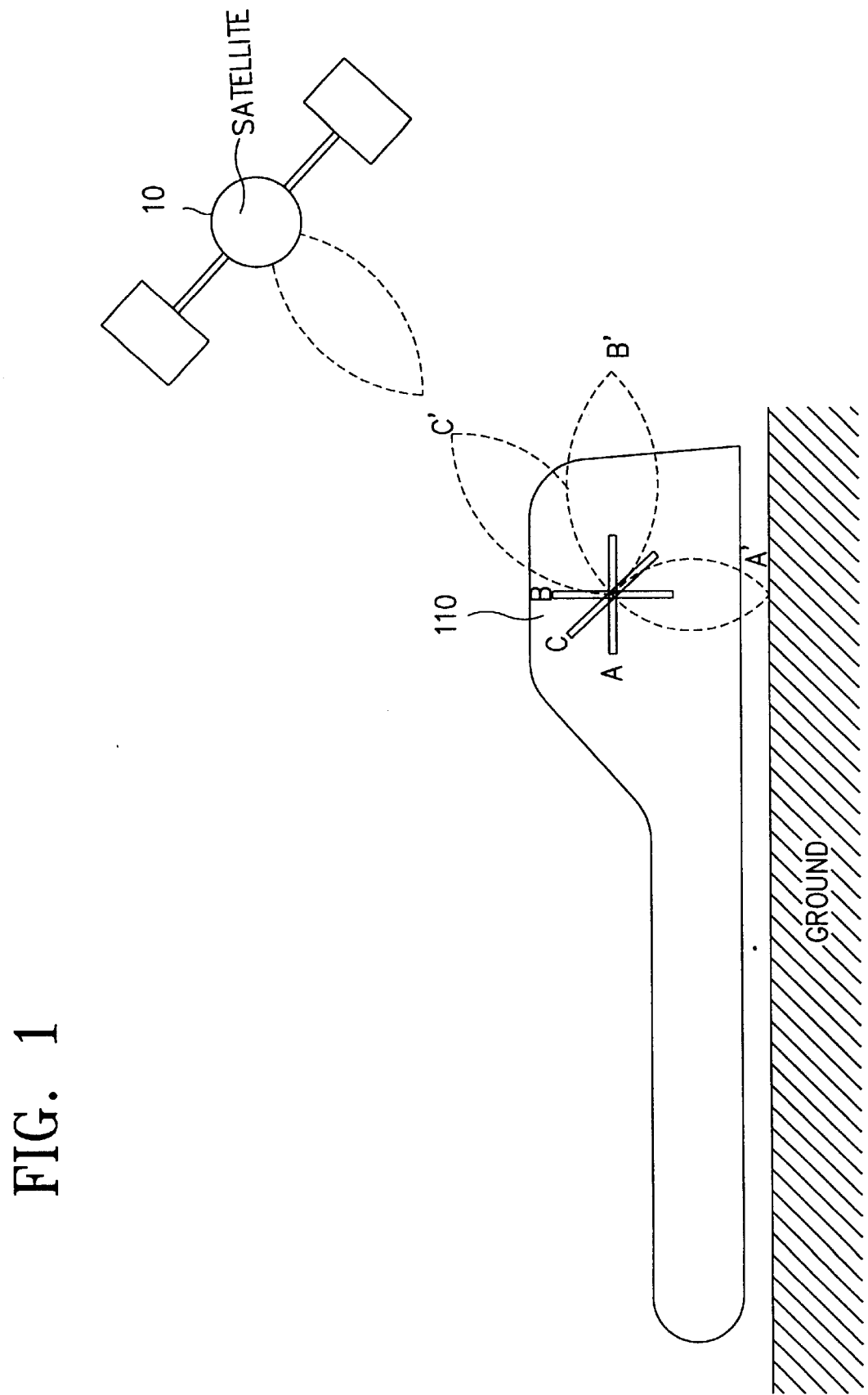
FIG. 1 is a diagram illustrating the directivity property of a flat antenna, which depends on the direction of the antenna.
Figure 2:
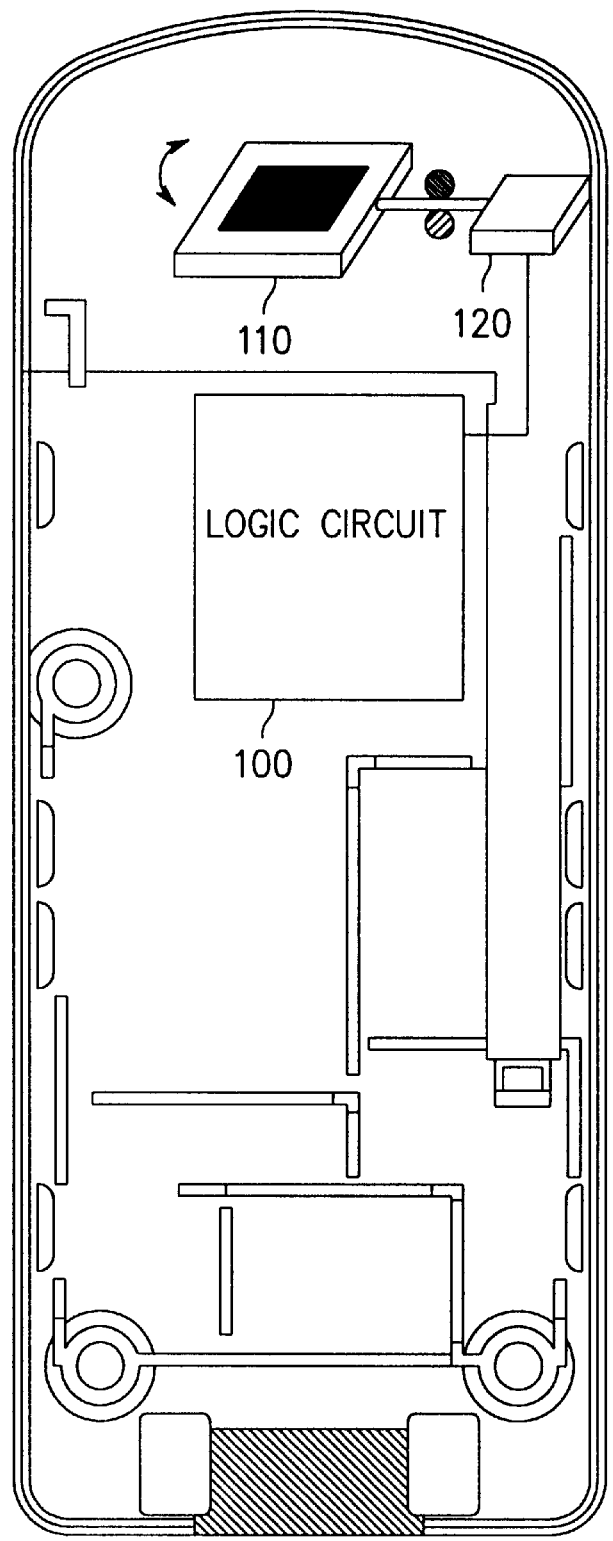
FIG. 2 is an interior view of a mobile communication terminal with an AI antenna driving device according to an embodiment of the present invention.
Figure 3:
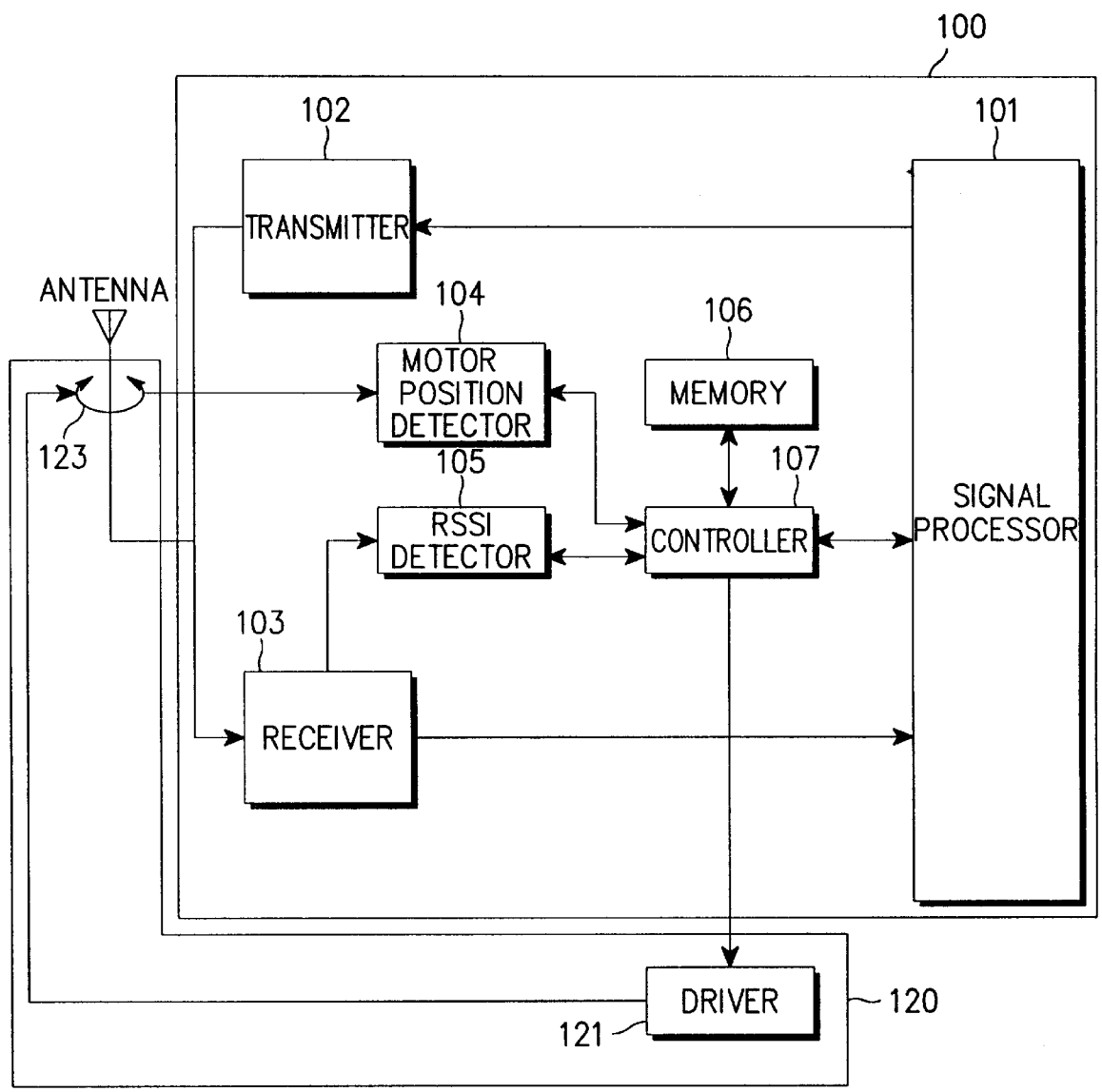
FIG. 3 is a block diagram illustrating an AI antenna driving device according to an embodiment of the present invention.

FIG. 2 shows a plan view of a mobile communication terminal with an AI antenna driving device according to an embodiment of the present invention, and FIG. 3 shows a block diagram of an AI antenna driving device according to an embodiment of the present invention.

Referring to FIG. 2, reference numeral 110 denotes a flat antenna, reference numeral 120 denotes a flat antenna driver, and reference numeral 100 denotes a logic circuit. The flat antenna 110, which is a directional antenna, receives a radio signal. The flat antenna driver 120 rotates the flat antenna 110 under the control of the logic circuit 100. The logic circuit 100 controls the overall operation of the mobile communication terminal.

Referring to FIG. 3, the flat antenna driver 120 includes a driver 121 and a motor 123. The driver 121 actuates the motor 123 to rotate its shaft on a step-by-step basis. The logic circuit 100 includes a signal processor 101, a transmitter 102, a receiver 103, a motor position detector 104, an RSSI detector 105, a memory 106 and a controller 107. The transmitter 102 converts an IF (Intermediate Frequency) signal received from the signal processor 101 to a radio signal and transmits the converted radio signal through the flat antenna 110. The receiver 103 converts a radio signal received through the flat antenna 110 to an IF signal. The signal processor 101 converts an audio signal or data input from an external device to an IF signal and provides the converted IF signal to the transmitter 102. Further, the signal processor 101 converts an IF signal output from the receiver 103 to an audio signal or data.

The motor position detector 104 connected to the motor 123, is controlled to detect the position of the motor 123. The RSSI detector 105 detects the RSSI value of the radio signal received by the receiver 103. The memory 106 stores the detected RSSI value and its associated flat antenna positional information. In addition, the memory 106 stores a reference RSSI value. The controller 107 controls the driver 121, the motor position detector 104 and the RSSI detector 105. More specifically, the controller 107 controls the driver 121 to rotate the shaft of the motor 123 by predetermined steps (or angles), and detects the RSSI value for every step using the RSSI detector 105 and the motor position detector 104. The controller 107 determines the position of the flat antenna 110 depending on the detected position of the shaft of the motor 123 and stores the RSSI value and the positional information of the flat antenna 110 in the memory 106.

In operation, the controller 107 rotates the shaft of the motor 123 by specific angles at stated periods using the driver 121, until the shaft is rotated by 360°. For example, if each step has an angle of 45°, 360°=45°×8. Therefore, to rotate the flat antenna 110 by 360°, the controller 107 rotates the shaft of the motor 123 by 8 steps. The controller 107 controls the motor position detector 104 to detect the position of the motor 123 whenever the shaft of the motor 123 rotates by one step, and simultaneously detects the RSSI value of the signal received by the receiver 103 using the RSSI detector 105. The motor positional information and the RSSI value, detected for each step, are stored in the memory 106. The controller 107 reads the positional information corresponding to the highest RSSI value of the RSSI values stored in the memory 106, and controls the driver 121 according to the read positional information to rotate the shaft of the motor 123 to the position corresponding to the position information. Whether to correct the position (or direction) of the flat antenna 110 and the time period between position corrections can be freely determined by the user.

Figure 4:
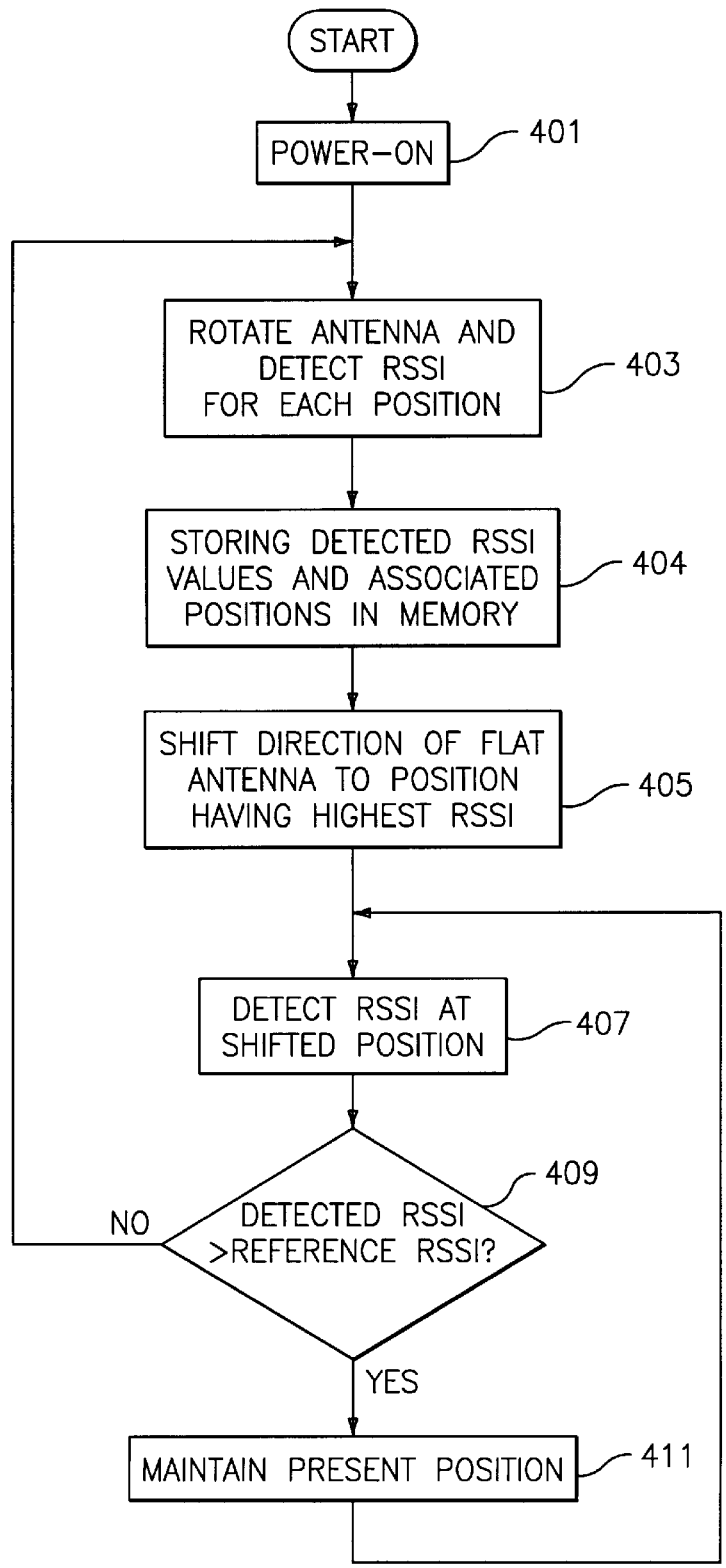
FIG. 4 is a flow chart illustrating a method for controlling an AI antenna driving device according to an embodiment of the present invention.

FIG. 4 shows a method for controlling the AI antenna driving device according to an embodiment of the present invention. Referring to FIG. 4, upon power-on in step 401, the controller 107 rotates the shaft of the motor 123 by predetermined steps using the driver 121 to rotate the flat antenna 110, in step 403. Further, the controller 107 detects the RSSI value for each step using the RSSI detector 105, and detects the associated position of the flat antenna 110 using the motor position detector 104. The controller 107 stores in memory 106 the RSSI value and its associated antenna positional information detected for each step in step 404, while the flat antenna 110 makes a complete rotation of 360°. Thereafter, in step 405, the controller 107 reads the antenna positional information corresponding to the highest RSSI value stored in memory 106 and rotates the flat antenna 110 to the corresponding position using the driver 121 and the motor 123. After rotating the flat antenna 110 to the position having the highest RSSI value, the controller 107 periodically detects the RSSI value at this position using the RSSI detector 105 in step 407. After each detection of the RSSI value, the controller 107 compares the detected RSSI value with a reference RSSI value stored in the memory 106 in step 409, to determine whether the detected RSSI value is higher than the reference RSSI value. If the detected RSSI value is higher than the reference RSSI value, the controller 107 maintains the present position of the flat antenna 110 in step 411. Otherwise, if the detected RSSI value is lower than or equal to the reference RSSI value, the controller 107 returns to step 403 to repeat the above procedure.

As described above, this novel antenna driving device automatically rotates the flat antenna to the position having the highest RSSI value according to the state of installation and working environment of the antenna, thus providing high-quality communication service.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. An antenna driving device for a mobile communication terminal including a flat antenna and a receiver for receiving a radio signal through the flat antenna, the device comprising:

a flat antenna driver for shifting a direction of the flat antenna by predetermined steps;

an RSSI (Received Signal Strength Indicator) detector for detecting an RSSI value of the received radio signal for each step of the flat antenna;

a position detector for detecting a position of the flat antenna;

a memory for storing the RSSI value detected for each step and the associated positional information of the flat antenna; and a controller for controlling the flat antenna driver and the RSSI detector, for comparing the detected RSSI value and a reference RSSI value, and for shifting the direction of the flat antenna to a position having a highest RSSI value by controlling the flat antenna driver.

2. The antenna driving device as recited in claim 1, wherein the flat antenna driver comprises:

a motor for shifting the direction of the flat antenna; and a driver for driving the motor under the control of the controller to shift the direction of the flat antenna.

3. A method for controlling an antenna driving device including a memory for storing a plurality of detected RSSI values, flat antenna positional information associated with the detected RSSI values, and a reference RSSI value, the method comprising the steps of:

(a) upon power-on, shifting a direction of the flat antenna by predetermined steps;

(b) detecting RSSI values for each of the predetermined steps;

(c) storing the detected RSSI values and associated flat antenna positional information in the memory;

(d) shifting the direction of the flat antenna to a position having the highest detected RSSI value;

(e) detecting an RSSI value at the shifted position and comparing the detected RSSI value with the reference RSSI value; and (f) repeating the steps (a) to (e), when the detected RSSI value is lower than or equal to the reference RSSI value.

4. The method as recited in claim 3, wherein step (e) is periodically repeated while the detected RSSI value is greater than the reference RSSI value.

5. The antenna driving device as recited in claim 1, wherein the direction of the flat antenna is shifted by a number of predetermined steps, each predetermined step being equal to degrees of rotation of a shaft of the flat antenna, said number of predetermined steps being equal to a complete rotation of the shaft of the flat antenna.

6. The antenna driving device as recited in claim 5, wherein the antenna driver shifts the flat antenna the number of predetermined steps at predetermined periods of time.

7. The method as recited in claim 3, wherein, in step (a), the direction of the flat antenna is shifted by a number of predetermined steps, each predetermined step being equal to degrees of rotation of a shaft of the flat antenna, said number of predetermined steps being equal to a complete rotation of the shaft of the flat antenna.

8. The method as recited in claim 7, wherein the flat antenna is shifted the number of predetermined steps at predetermined periods of time.

9. A method for controlling an antenna driving device including a memory for storing a plurality of detected RSSI values, flat antenna positional information associated with the detected RSSI values, and a reference RSSI value, the method comprising the steps of:

shifting a direction of the flat antenna by predetermined steps;

detecting RSSI values for each of the predetermined steps;

storing the detected RSSI values and associated flat antenna positional information in memory;

shifting the direction of the flat antenna to the position having the highest detected RSSI value;

detecting an RSSI value at the shifted position:

comparing the RSSI value at the shifted position with the reference RSSI value; and repeating periodically all of the previous steps when the detected RSSI value is lower than or equal to the reference RSSI value.

10. The method as recited in claim 9, wherein the step of shifting the direction of the flat antenna by predetermined steps is performed upon power-on.

11. The method as recited in claim 9, further comprising the step of:

repeating periodically the steps of claim 9 when the detected RSSI value is greater than the reference RSSI value.

* * * * *